(No Model.)
W. MERRILL.
MACHINE FOR CUTTING WOOD.
No. 384,704. Patented June 19, 1888.
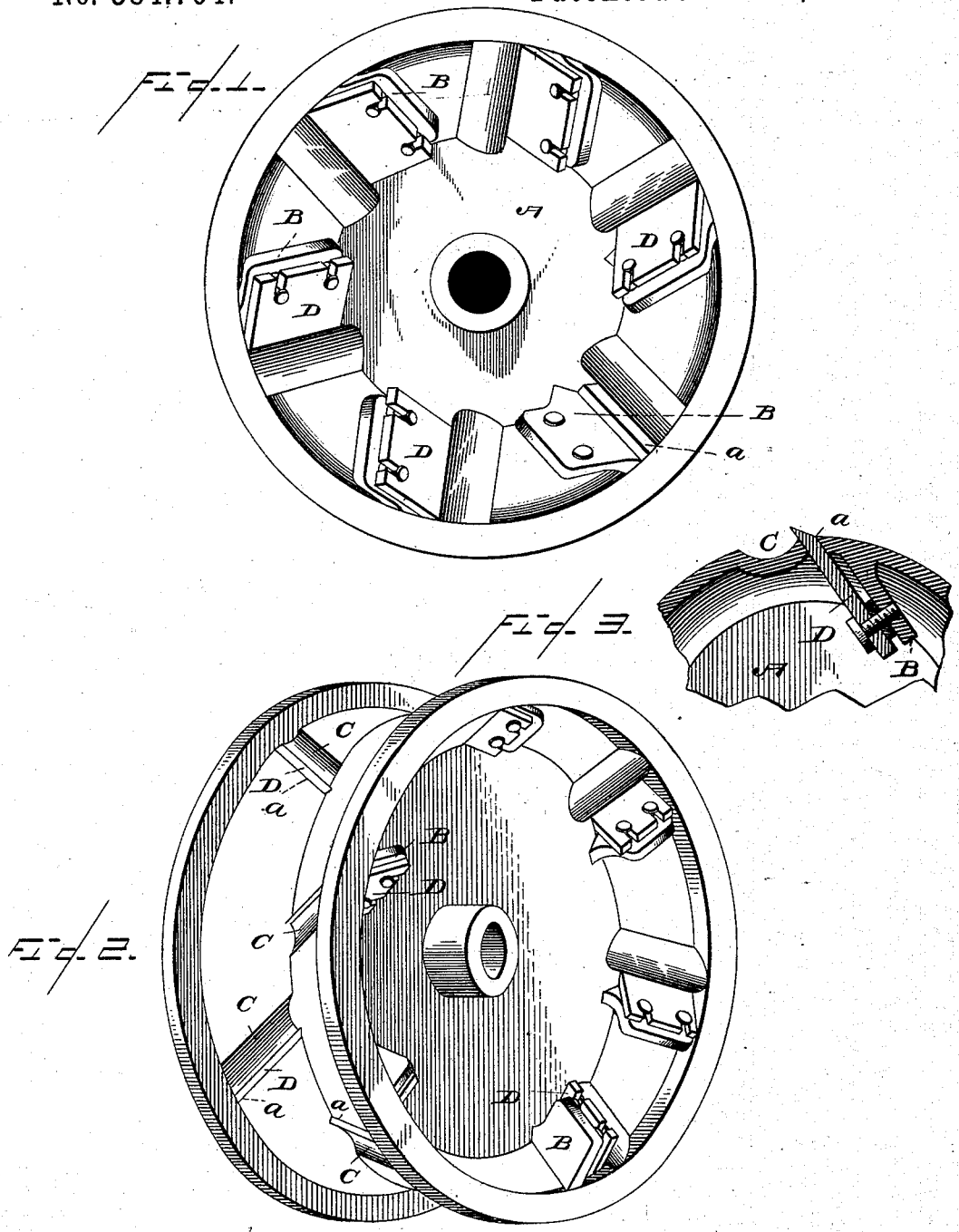
WITNESSES.
INVENTOR.
Wm. Merrill.
By James J. Sheehy,
Attorney.

UNITED STATES PATENT OFFICE.

WILLIAM MERRILL, OF EAST SAGINAW, MICHIGAN, ASSIGNOR OF ONE HALF TO S. S. MITTS, OF SAME PLACE.

MACHINE FOR CUTTING WOOD.

SPECIFICATION forming part of Letters Patent No. 384,704, dated June 19, 1888.

Application filed November 22, 1887. Serial No. 255,931. (No model.)

*To all whom it may concern:*

Be it known that I, WILLIAM MERRILL, a citizen of the United States, residing at East Saginaw, in the county of Saginaw and State of Michigan, have invented certain new and useful Improvements in Wood-Cutting Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to machines for cutting refuse wood, and is designed as an improvement upon the devices shown and described in the Letters Patent granted to E. G. Pake, September 7, 1886, No. 348,768.

The invention has for its object the arrangement and adjustment of the knives and throat, so that the said knives will cut with greater ease and without liability of their clogging with small particles of wood.

A serious objection to machines of this class as heretofore constructed has been that in operation the dust flies in a tangent away from the rim of the wheel, and does not pass inwardly through the openings, but strikes on the surrounding case or on the conveyers beneath the wheel, and, bounding back, it accumulates inside the rim of the wheel, and, seeking to fly outwardly through the openings, bulges under the edges of the knives, being driven with great force induced by the centrifugal action of the high speed. This action clogs the under sides of the knives and very much retards the cutting. A further and serious objection has been that the compact masses of dust gathered at each opening fly off one at a time, thereby throwing the wheel out of balance, so that the wheel a large portion of the time has a wabbling or shaking motion, causing much undue wear and damage to the parts, besides very imperfectly performing its operation.

The invention will be fully understood from the following description and claims, when taken in connection with the accompanying drawings, in which—

Figure 1 is a side view of a wheel embodying my improvements. Fig. 2 is a perspective view of the same, and Fig. 3 is a sectional detail view taken through one of the cutters.

Referring by letter to the said drawings, A indicates a wheel of metal having a V-shaped periphery similar to that shown in the patent above referred to. The oblique walls of this periphery are slotted, as shown at $a$, the base of the slots or inner ends meeting at the angle of the V, and the slots of each wall alternate, as more fully shown in Fig. 3 of the drawings. On the inner side of the rim or periphery are formed bearings B, for the attachment and support of the cutter-blades, as more fully shown in Fig. 2. These bearings are provided with perforations for the passage of securing-bolts, which hold the cutters adjustably in position by means of nuts or other suitable fastening devices. The slots $a$, while permitting the cutters to pass through them, are of a width to snugly engage the same and fit them so closely as to prevent any dust from passing through when the knives are in position. The rim or periphery is provided on its outer side just beneath each slot with a curved throat or cavity, C, so as to permit of free and ready clearance for the chips. These curved throats may extend the length of the slots, and may be of any desired depth and form.

It is obvious that while the bearings B are shown as formed entire with the wheel, yet these bearings may, if desired, be formed separately and attached to the wheel by suitable means without departing from the spirit of my invention.

D indicates the cutters, which are of the form usually employed in this class of devices. These cutters are slotted, as shown, for the passage of the connecting-bolts, whereby they may be readily adjusted in the slots.

Having described my invention, what I claim is—

In a machine for cutting refuse wood, a knife-bearing wheel having a V-shaped periphery and slots to snugly receive knives, with knives fitting in the close slots, and having cavities in face of wheel under the knives for clearance of chips.

In testimony whereof I affix my signature in presence of two witnesses.

WILLIAM MERRILL.

Witnesses:
WM. J. WINSTON,
F. A. WOODRUFF.